No. 697,410. Patented Apr. 8, 1902.
L. E. KROTZ.
VARIABLE SPEED GEARING.
(Application filed May 27, 1901.)
(No Model.) 2 Sheets—Sheet 1.
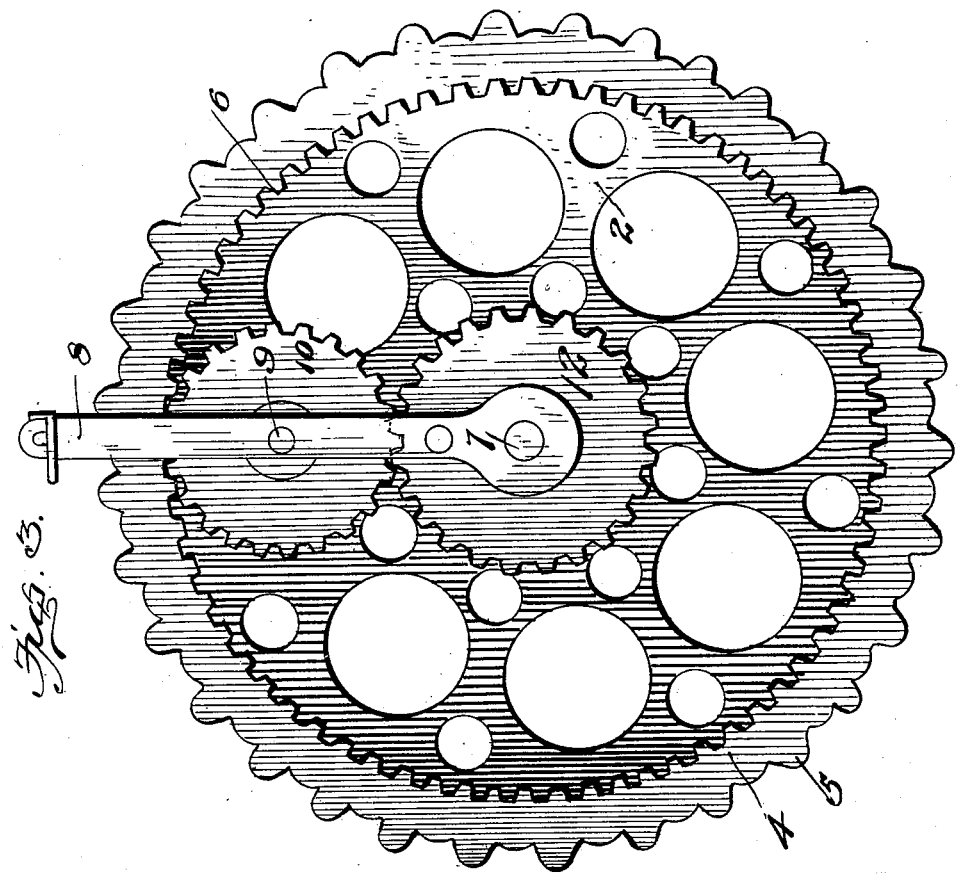
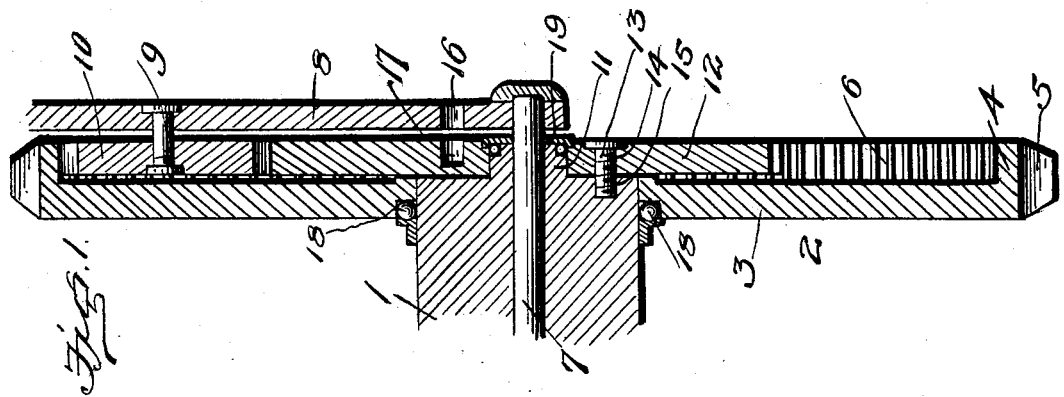

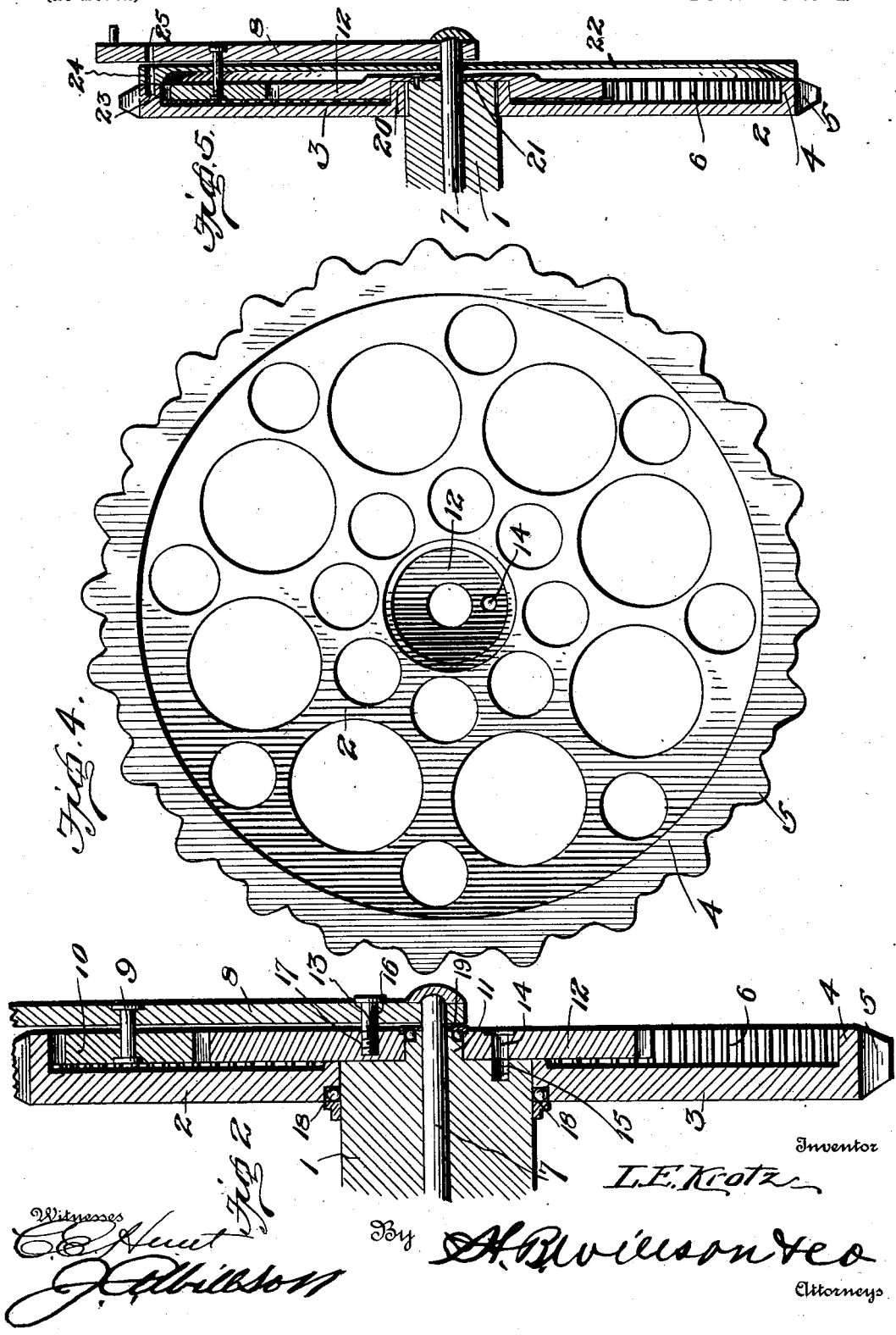

UNITED STATES PATENT OFFICE.

LINFORD ELLSWORTH KROTZ, OF CHEYENNE, WYOMING, ASSIGNOR OF TWO-THIRDS TO FREDERICK W. ROEDEL AND GORHAM T. SEABURY, OF CHEYENNE, WYOMING.

VARIABLE-SPEED GEARING.

SPECIFICATION forming part of Letters Patent No. 697,410, dated April 8, 1902.

Application filed May 27, 1901. Serial No. 62,072. (No model.)

*To all whom it may concern:*

Be it known that I, LINFORD ELLSWORTH KROTZ, a citizen of the United States, residing at Cheyenne, in the county of Laramie and State of Wyoming, have invented certain new and useful Improvements in Variable-Speed Gearing; and I do declare the following to be a full, clear, and exact description of the invention, such as will enable others skilled in the art to which it appertains to make and use the same.

This invention relates to variable-speed gearing for bicycles and other vehicles and machinery in which it is desirable with a given speed of rotation of a crank to derive variable speeds of a power-receiving gear or wheel, the object in view being to provide a simple, durable, and effective construction of gearing which may be conveniently adjusted in such manner that the speed may be applied directly or multiplied at the will of the operator.

Further objects and advantages of the invention will appear in the course of the following description, and the novel features thereof will be particularly pointed out in the appended claims.

In the accompanying drawings, Figure 1 is a vertical transverse section through one end of the hub or crank-hanger of a bicycle and the gearing and showing the application of the latter thereto, with the parts arranged for high-speed gearing. Fig. 2 is a sectional view showing the parts adjusted to provide a low-speed gearing. Fig. 3 is a side elevation looking toward the outer face of the sprocket-wheel. Fig. 4 is a similar view looking toward the inner face of the sprocket-wheel; and Fig. 5 is a view similar to Figs. 1 and 2, showing a modification in the construction of the gearing.

Referring now more particularly to the drawings, the numeral 1 represents a crank-hanger, hub, or stationary bearing of a bicycle or other vehicle or driving mechanism, about which hub is mounted to turn a sprocket-wheel 2, preferably formed of a plate 3 and a rim 4, carrying the sprocket-teeth 5, said plate being disposed upon the inner side of the sprocket-wheel, as shown. The rim 4 is formed with an internal gear 6.

7 denotes a crank-axle mounted in the hanger or hub 1 and having suitably secured to the end thereof the pedal crank or lever 8, which is provided with a stub-shaft 9, projecting inwardly through and on which is journaled a revoluble planetary spur-pinion 10, which gears with the internal rim 6. The outer end of the hanger, hub, or stationary bearing 1 is reduced to form a journal 11, on which is loosely mounted to revolve a spur gear-wheel 12, which meshes with the said pinion 10. This gear-wheel may be rigidly connected to the hanger or hub 1 by means of a pin or screw 13, inserted in openings 14 and 15 formed therein and in said hanger to cause the pinion 10 to rotate independently and transmit motion to the sprocket-wheel 2, or it may be connected with the crank or lever 8 by removing the screw or pin 13 from the openings 14 and 15 and inserting the same within corresponding openings 16 and 17, formed therein and in the said crank or lever 8, as shown in Fig. 2, whereby said gear will turn loosely on the journal 11 and will interlock and be held rigid with the pinion 10 and sprocket-wheel 2, so as to adapt all parts to revolve together. As shown in Fig. 1, when the screw or pin 13 is fitted in the openings 14 and 15 the gear-wheel 12 is rigidly connected with the hanger or hub 1; but the spur-pinion 10 is free to revolve on its axis 9 and to traverse the gear-wheel 12, whereby when motion is imparted to revolve the crank or lever at a determined rate of speed such rate of speed will be multiplied through the medium of said pinion and transferred to the sprocket-wheel 2, which will thereby be caused to revolve at a greater rate of speed than said crank or lever 8. By varying the relative proportion of the gears 10 and 12 the speed of rotation of the sprocket-wheel multiplied through the action of the pinion may be varied and its speed increased or decreased proportionately to the speed of the crank. When the pin or screw 13 is removed from the openings 14 and 15, however, and inserted within the openings 16 and 17, the gear-wheel 12 is free to turn upon the journal 11 and is rigidly connected with the crank or lever 8. The gear 12 being thus rigidly connected with the crank or lever will hold the pinion 10 locked against movement, and as said pinion cannot turn, but is rigidly connected by its teeth with the teeth of the internal gear 6, it will be seen that all the parts will be connected together against independent movement, so that when the crank or lever 8 is turned the sprocket-wheel 2 will be turned therewith and at the same rate of speed.

In order to insure easy operation of the parts, bearing-balls 18 may be arranged between the bearing-surface of the hanger 1 and the sprocket-wheel 2 and between said hanger and the crank-shaft 7, and a cap 19 may be applied to the outer end of the journal 11 to confine the balls and exclude dust and dirt. Antifriction-balls may also be interposed between the journal 11 and the gear-wheel 12, if desired.

In the modification of the invention disclosed in Fig. 5 variations in the details of construction are made; but the essential features and mode of operation of the device remain essentially the same. In order to adapt the invention for application to bicycles, wherein it is impracticable to form the journal 11 upon the end of the hanger or hub 1, I provide the plate 3 of the sprocket-wheel with an annular outwardly-extending flange 20, which serves as a journal, on which the gear-wheel 12 is mounted to revolve. In order to provide for connecting said gear-wheel with the hub or hanger 1 also, said gear-wheel is formed upon its outer side with a flange 21, which bears against the outer faces of the journal 20 and hanger or hub 1 and is formed with the opening 14 for the reception of the pin or screw 13 to connect it with said hanger or hub. A dust-cap or plate 22 is furthermore employed in this embodiment of the invention to bear upon the outer surfaces of the rim 4 to exclude dust and dirt from the interior of the sprocket-wheel and the gears therein. This plate or dust-cap is suitably secured to the crank or lever 8 to turn therewith. Fig. 5 shows the parts connected up for driving the gearing at high speed, and to connect them to change to low speed the rim 4, plate 22, and crank 8 are formed with apertures 23, 24, and 25 for the reception of the pin or screw 13, which when inserted within said apertures will lock the parts to rotate together, so that the sprocket-wheel will have the same speed of revolution as the crank.

Having thus fully described my invention, what I claim, and desire to secure by Letters Patent, is—

1. In a variable-speed gearing, the combination of a hub or stationary bearing provided with a locking-opening, an internal gear rotatably mounted thereon, a central gear also rotatably mounted upon the hub and provided with a pair of locking-openings, one of which is adapted to coöperate with the opening in the hub, a crank-axle mounted in said hub, a crank or lever fixed to the axle and provided with a locking-opening to coöperate with the other locking-opening in the central gear, a planetary gear carried by the lever and meshing with the internal and central gears, and a locking pin or screw interchangeable for insertion into either of the said two sets of locking-openings for rigidly connecting the central gear to the hub to adapt the internal gear to run at a higher rate of speed than the crank, or to rigidly connect the movable parts so as to adapt the internal gear to rotate with the crank at a corresponding rate of speed, substantially as set forth.

2. In a variable-speed gearing, the combination, with a stationary bearing and a crank-arm, of a rotatable internal gear, a rotatable central gear, an interposed planetary gear carried by the crank-arm, the said parts being provided with two sets of coöperative locking-openings, and a locking pin or screw interchangeable for insertion into either of said sets of openings, for in one instance, locking the central gear to the hub, and, in the other instance, locking the movable parts of the gearing, including said central gear together, substantially as described.

In testimony whereof I have hereunto set my hand in presence of two subscribing witnesses.

LINFORD ELLSWORTH KROTZ.

Witnesses:
A. W. DEUEL,
GUY TIPPIN.